United States Patent
Xia et al.

(10) Patent No.: US 8,696,955 B2
(45) Date of Patent: Apr. 15, 2014

(54) METHOD OF MAKING POLYMER HOLLOW PARTICLES WITH CONTROLLABLE HOLES IN THEIR SURFACES

(75) Inventors: Younan Xia, Seattle, WA (US); Sang Hyuk Im, Pohang (KR); Unyong Jeong, Seoul (KR)

(73) Assignee: University of Washington, Seattle, WA (US)

( * ) Notice: Subject to any disclaimer, the term of this patent is extended or adjusted under 35 U.S.C. 154(b) by 375 days.

(21) Appl. No.: 12/627,963

(22) Filed: Nov. 30, 2009

(65) Prior Publication Data

US 2010/0074930 A1 Mar. 25, 2010

Related U.S. Application Data

(62) Division of application No. 11/493,862, filed on Jul. 25, 2006, now abandoned.

(60) Provisional application No. 60/702,433, filed on Jul. 25, 2005.

(51) Int. Cl.
 *A61K 9/50* (2006.01)
(52) U.S. Cl.
 USPC .......................................................... 264/28
(58) Field of Classification Search
 USPC .......................................................... 264/28
 See application file for complete search history.

(56) References Cited

U.S. PATENT DOCUMENTS

| | | | | |
|---|---|---|---|---|
| 3,891,577 A | * | 6/1975 | Kershaw et al. | 521/63 |
| 3,919,542 A | | 11/1975 | Castic | |
| 4,793,980 A | * | 12/1988 | Torobin | 423/213.5 |
| 4,818,542 A | * | 4/1989 | DeLuca et al. | 424/491 |
| 5,019,400 A | * | 5/1991 | Gombotz et al. | 424/497 |
| 5,409,776 A | * | 4/1995 | Someya et al. | 428/402.24 |
| 6,184,300 B1 | | 2/2001 | Shimokawa | |
| 6,479,146 B1 | | 11/2002 | Caruso | |
| 6,602,932 B2 | | 8/2003 | Feldheim | |
| 6,720,007 B2 | | 4/2004 | Walt | |
| 7,195,780 B2 | | 3/2007 | Dennis | |
| 2004/0219360 A1 | | 11/2004 | Walt | |

OTHER PUBLICATIONS

Guanghui, M., and J. Li, "Compromise Between Dominant Polymerization Mechanisms in Preparation of Polymer Microspheres," Chemical Engineering Science 59:1711-1721, 2004.
Im, S.H. et al, "Polymer Hollow Particles With Controllable Holes in Their Surfaces," Nature Materials 4:671-675, Sep. 2005.
Wang, H. et al, "Hollow Porous Poly(lactic acid) Microspheres," Journal of Applied Polymer Science 107:1189-1193, 2008; published online Oct. 9, 2007 in Wiley InterScience (www.interscience.wiley.com).

* cited by examiner

*Primary Examiner* — Larry Thrower
*Assistant Examiner* — Xue Liu
(74) *Attorney, Agent, or Firm* — Christensen O'Connor Johnson Kindness PLLC

(57) ABSTRACT

A method for making a hollow polymer particle having a single, substantially circular opening in its surface.

18 Claims, 7 Drawing Sheets

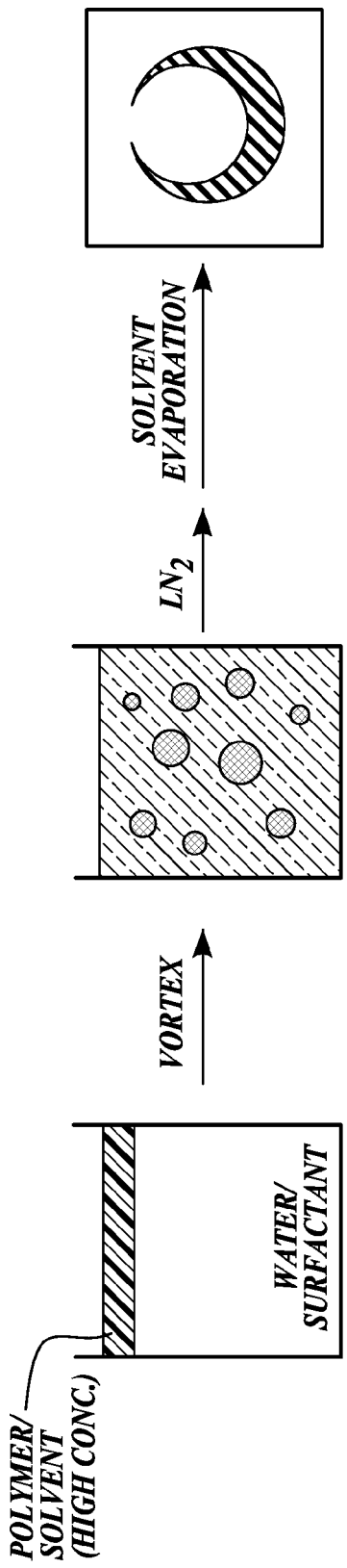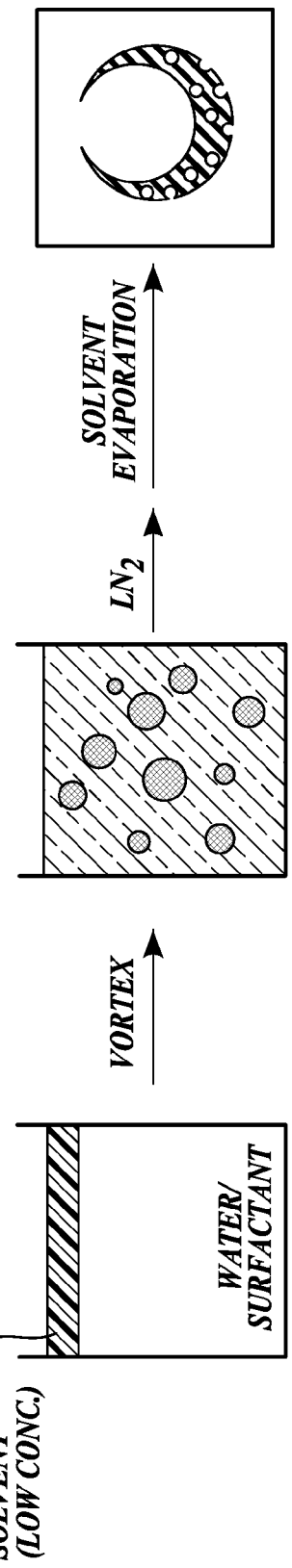
*Fig. 2A.*
*Fig. 2B.*

METHOD OF MAKING POLYMER HOLLOW PARTICLES WITH CONTROLLABLE HOLES IN THEIR SURFACES

CROSS-REFERENCES TO RELATED APPLICATIONS

This application is a division of U.S. application Ser. No. 11/493,862, filed Jul. 25, 2006, which claims the benefit of U.S. Provisional Application No. 60/702,433, filed Jul. 25, 2005. Each application is expressly incorporated herein by reference in its entirety.

STATEMENT OF GOVERNMENT LICENSE RIGHTS

This invention was made with government support under Contract No. F49620-01-1-0364, awarded by the Air Force Office of Scientific Research. The government has certain rights in the invention.

BACKGROUND

Colloidal particles with hollow interiors play important roles in microencapsulation—a process that has found widespread use in applications such as controlled release of drugs, cosmetics, inks, pigments, or chemical reagents; protection of biologically active species; and removal of pollutants. The hollow particles are most commonly prepared by coating the surfaces of colloidal templates with thin layers of the desired material (or its precursor), followed by selective removal of the templates via calcination or chemical etching. This simple and straightforward approach works for a variety of materials that include polymers, ceramics, composites, and metals. For polymers, methods such as emulsion polymerization, phase separation, crosslinking of micelles, and self-assembly have also been demonstrated for generating hollow structures. However, diffusion through these closed shells with pores less than 10 nm in diameter is often a slow process. To solve this problem, capsules have been fabricated by organizing colloids around liquid droplets to form colloidosomes or by controlling the mixing of liquid droplets.

Hollow polymer particles with holes in their surfaces have previously been created using water-soluble polymerization inhibitors when polymerizing polystyrene microparticles from styrene drops emulsified in an aqueous phase. Additionally, the use of a sacrificial-core/polymer-shell method was used to create hollow polymer particles with holes in their surfaces by controlling the amount of crosslinker in the living radical polymerization mixture.

The fabrication of polymer particles with holes in their surfaces is still difficult using current techniques. Additionally, nanometer-scale hollow polymer particles with holes in their surfaces have not yet been fabricated. There is a need for both smaller and more easily fabricated structures of this type.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect the invention provides a hollow, polymer particle, comprising a substantially spherical polymeric particle having a radius of about 200 nm to less than about 500 nm and having a single, substantially circular opening in the particle's surface.

Another aspect of the invention provides a method for making a hollow, polymer particle having a single, substantially circular opening, comprising: suspending solid polymer particles in a first solvent to provide first solvent suspended particles; swelling the first solvent suspended particles with a second solvent to provide second solvent swollen particles; cooling the second solvent swollen particles below the freezing temperature of the second solvent, to create a void within each particle, providing second solvent-containing particles having frozen second solvent; and warming the second solvent-containing particles having frozen solvent, wherein the second solvent escapes from the particle resulting in the formation of a single opening in the surface of the particle to provide a hollow, polymer particle having a single, substantially circular opening.

Another aspect of the invention provides a method for making a hollow, polymer particle having a single, substantially circular opening particle, comprising: dissolving a polymer in a first solvent; adding the dissolved polymer solution to a second solvent solution containing a surfactant; agitating the mixture providing an emulsion of the polymer in the second solvent; cooling the second solvent emulsion below the freezing temperature of the second solvent to create a void within each particle, providing second solvent-containing particles with frozen second solvent; and warming the second solvent-containing particles having frozen solvent, wherein the second solvent escapes from the particle resulting in the formation of a single opening in the surface of the particle to provide a hollow, polymer particle having a single, substantially circular opening.

Another aspect of the invention provides a method for encapsulating a material within a polymer particle, comprising contacting a plurality of hollow, polymer particles, each having a single, substantially circular opening, with a material such that at least some of the material is positioned within the hollow, polymeric particle, and closing the opening to provide a polymer particle containing the material.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 2A and 2B depict the experimental steps used to produce hollow polymer particles, with a single large hole and either a smooth surface (FIG. 2A), or a nanoporous one (FIG. 2B), using a polymer emulsion technique;

DETAILED DESCRIPTION

Figure 1A:
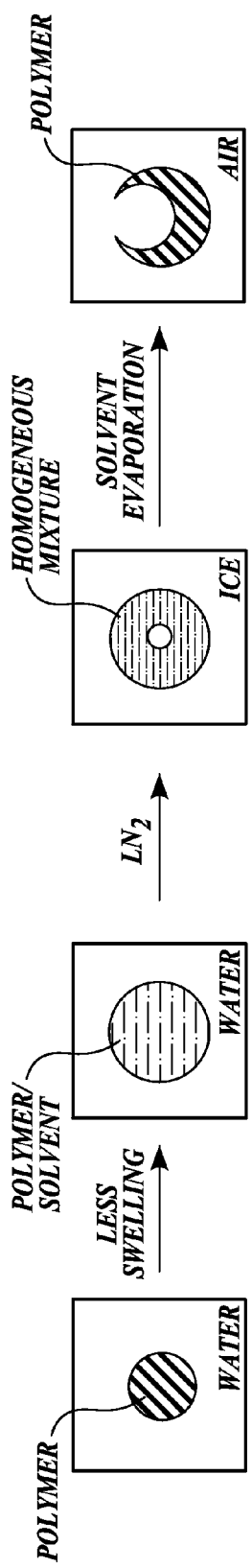
FIGS. 1A and 1B depict the experimental steps used to produce hollow polymer particles, with a single large hole and either a smooth surface (FIG. 1A), or a nanoporous one (FIG. 1B), from solid polymer particles.

In one aspect, the present invention provides a hollow, polymer particle, comprising a substantially spherical polymeric particle having a radius of about 200 nm to less than about 500 nm, and a single, substantially circular opening in the particle's surface. A particle is hollow if there is a void of any size near the center of the particle. Generally, the polymeric material between the center void and the circular surface opening will be removed, as well.

Suitable polymer materials for making hollow polymer particles include polymers that can be prepared as colloidal particles or emulsions. Generally, this requires a solvent that easily dissolves the polymer, but that is poorly miscible with the second solvent the particles are suspended in. The appropriate second solvent must be able to swell the polymer particles and can be limited to satisfy following equation:

$$(|Sqrt(\delta_{vs}-\delta_{vP})^2+(\delta_{hs}-\delta_{hP})^2|)<5 \ [J^{0.5}/m^{1.5}]$$

$$\delta_{vs}=Sqrt(\delta_{ds}^2+\delta_{ps}^2), \ \delta_{vP}=Sqrt(\delta_{dP}^2+\delta_{pP}^2)$$

where $\delta_d$, $\delta_p$, and $\delta_h$ represents the contribution from dispersion force, polar interactions, and hydrogen bonding, respectively. $_s$: the solvent, $_P$: the polymer, Sqrt means square root.

For example, if polystyrene is used as the polymer particle, the appropriate second solvent can be benzene, toluene, styrene, methylmethacrylate, α-methyl styrene, benzylmethacrylate, chloroform, tetrahydrofuran, cyclohexane, dioctane, methylethylketone or others that satisfy the above conditions.

Representative polymer particle materials include the amorphous polymers polystyrene (PS), and polymethyl methacrylate (PMMA). The synthesis of representative polystyrene particles is described in EXAMPLE 1. Semi-crystalline polymers can also be used, including the representative polymers polycaprolactone (PCL) and poly(L-lactic acid) (PLLA). The method is applicable to other polymers: if the polymer/solvent pair meets the condition that the second solvent has a lower melting temperature than the first solvent and is highly miscible with the polymer, but immiscible with the first solvent. For examples, amorphous polymers such as polybutadiene (PB), polycarbonate (PC), and polyacrylate (PAA) and crystalline polymers such as polybutylene terephthalate (PBT), polyethylene glycol (PEG), and polyvinylidene fluoride (PVDF) can be directly used with water as the first solvent and toluene as the second solvent.

In one embodiment, the substantially circular opening in the polymer particle's surface has a radius that is smaller than or equal to the radius of the polymer particle. In a further embodiment, the circular opening in the polymer particle's surface has a radius from about 50 nm to about 225 nm.

In a further embodiment, the surface of the polymer particle contains nanopores. As used herein, "nanopore" is a pore 100 nm or smaller in diameter.

In another embodiment, the polymer particle comprises a small molecule, a macromolecule, a nanoparticle, or a colloidal particle.

As used herein, "small molecule" is a molecule with a molecular weight below 1000 g/mole.

"Nanoparticle" refers to a particle that has one dimension measuring less than 1 μm in diameter and 1 nm or greater in diameter. These particles are usually substantially spherical in shape, but can also be in the shape of cubes, boxes, pyramids, higher order geometric shapes, or non-symmetrical shapes. A higher order geometric shape is a three dimensional shape with five or more vertices.

"Macromolecule" refers to a molecule that has a molecular weight over 1000 g/mole. Examples of macromolecules include polymers and proteins.

"Colloidal particle" refers to a particles with size in the range of 10 nm to 1 μm.

Representative small molecules include the fluorescent dye coumarin-6, as detailed in EXAMPLE 2, and any other organic dye: organic light-emitting diode dye, organic fluorescent dye, photochromic dye, pharmaceutical compounds, organic-inorganic complexes such as silicon octaethylporphyrin (SiOEP) and platinum octaethylporphyrin (PtOEP).

Representative macromolecules include the fluorescent protein dinitrophenol-conjugated bovine serum albumin, proteins, DNA, RNA, and polymer light-emitting diode materials. Virtually any macromolecule soluble in the first solvent can be applicable.

Representative nanoparticles include nanometer-scale superparamagnetic iron oxide particles and any type of quantum dot (e.g., CdS, CdSe, PbS), any metal oxide nanoparticles (e.g., silica, titania, zirconia, zinc oxide, tin oxide, aluminum oxide, barium titanite, thallium oxide, yttrium oxide, copper oxide), and any metal nanoparticles (e.g., Ag, Au, Pd, Pt). Of particular note are metal nanoparticles with surface plasmon resonance properties and semiconductor nanoparticles such as quantum dots with strong fluorescence.

Representative colloidal particles for loading into the hollow particles include polystyrene particles of a diameter smaller than the size of the opening in the surface of the polymer particle of the present invention, silica particles, and metal particles.

In a further embodiment, the small molecule, macromolecule, nanoparticle, or colloidal particle is substantially positioned inside the radius of the polymer particle. In this embodiment, materials are either physically within the void of the hollow particle or materials are incorporated into the polymeric lattice of the polymer shell. An example of a material being incorporated in to the polymeric lattice of the polymer shell would be a small molecule that was dissolved in a solvent, also containing polymer particles, that allowed the small molecule to be absorbed or adsorbed by the polymer particles. When the polymer particle is removed from the small molecule containing solvent, the small molecule will remain on the surface of the polymer particle or within the polymeric lattice of the polymer particle.

In another aspect, the present invention provides a method for making a hollow, polymer particle having a single, substantially circular opening, comprising suspending solid polymer particles in a first solvent; swelling the suspended particles with a second solvent to provide second solvent swollen particles; cooling the second solvent swollen particles below the freezing point of the second solvent to create a void within each particle to provide frozen second solvent containing particles; and warming the frozen second solvent containing particles to allow the second solvent to escape from the particle, resulting in the formation of a single opening in the surface of the particle to provide a hollow, polymer particle having a single, substantially circular opening. This method is detailed in FIG. 1A and described using polystyrene particles in EXAMPLE 2.

Figure 1B:
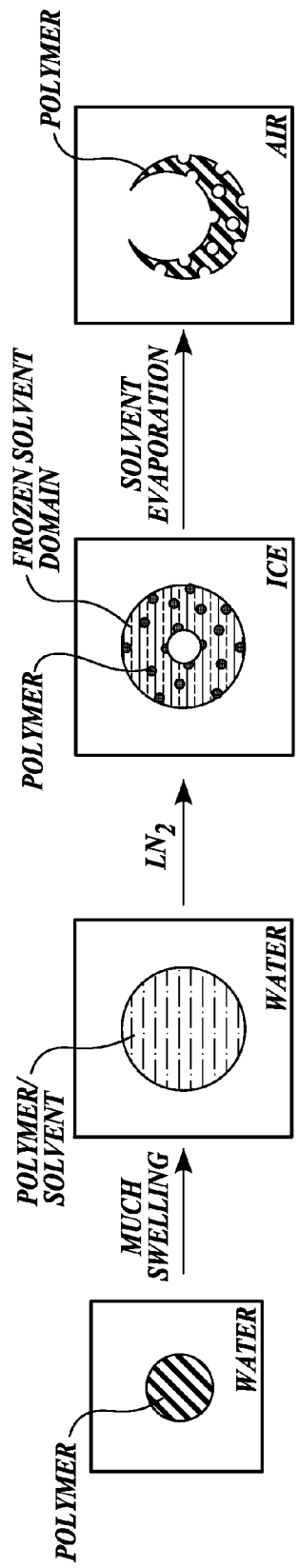

FIG. 1 depicts a schematic outline for the synthesis of polymer bowls from pre-made colloids. FIG. 1A and FIG. 1B depict polymer bowls without and with nanopores in the surface, respectively.

The method includes a first solvent and a second solvent that can be immiscible with the first. In one embodiment, the first and second solvents are substantially immiscible. The first solvent acts as a medium that is not substantially immiscible with the second solvent and does not substantially solvate polymer particles. In one embodiment, the appropriate weight ratio of the second/first solvent is between about 0.01 and about 20. Below about 0.01 it is difficult for the second solvent to swell the suspended polymer particles, and above about 20 it is difficult to make uniform solvent/polymer mixture drops because excess solvent solvates the polymer and forms agglomerates of the bulk solvent and polymer. The second solvent has a lower melting temperature than that of the first. The second solvent solvates the polymer particles. Representative first solvents are water, ethylene glycol, glycerol, and mixtures of appropriate first solvents. Representative second solvents include toluene, styrene, methylmethacrylate, chloroform, benzene, n-hexane, cyclohexane, and mixtures of appropriate second solvents.

In one embodiment, the method includes polymer particles that become solvated by the second solvent. The degree of swelling caused by the second solvent will determine if nanopores will form on the surface. Nanopores provide an additional functionality to a polymer particle by creating pockets on the surface that are capable of storing and releasing materials. Typical polymer particle materials include polystyrene (PS) and poly(methyl methacrylate) (PMMA), including PS and PMMA polymer particles having modified surfaces. Coalescence between the swollen beads can be circumvented by choosing PS beads with negatively charged groups on the surface. Typical negatively charged surface groups include sulfate and carboxylate groups. The degree of swelling of the beads by the second solvent will determine the level of nanopore formation on the surface of the final hollow polymer particle. The more swollen the polymer particles become, the more likely they are to develop nanopores. A high degree of swelling will result in nanopores as seen in FIG. 1B and FIG. 2B for solid polymer particles and emulsions, respectively. For a commercial PS system having 2.5 wt % polymer particles, a high degree of swelling will result if the volume of suspension solution and styrene is 1:2. No nanopores will result from less swelling, which results if the suspension solution and styrene are in a 2:2 ratio. For the emulsion system as depicted in FIG. 2, a polymer concentration in solvent of 5 wt % will yield more swollen particles and thus a nanoporous surface. A polymer concentration in solvent of 10 wt % will yield less swollen particles and thus a nanopore-free surface.

The method includes freezing the second solvent swollen polymer particles. In one embodiment of the method, this is done combining the suspension with liquid nitrogen (LN$_2$) (−210° C.). In one embodiment, the combination of the suspension and liquid nitrogen is accomplished by pouring the suspension into liquid nitrogen. In a system where the first solvent is water, the second solvent is toluene and the polymer particles are PS, due to the poor thermal conductivity of PS, a temperature gradient is formed in the radial direction and solidification of toluene starts from the surface. Because the density of toluene increases from 0.86 g/cm$^3$ (ρL) to 1.03 g/cm$^3$ (ρS) as toluene is solidified, toluene moves toward the surface creating a void of R$_V$ in radius at the center. Assuming the total volume of PS chains and the outer radius (R$_{PS/T}$ is the post-swelling radius and R$_{PS}$ is the pre-swelling radius of the polymer particle) of each swollen particle does not change in the freezing process, the void size can be estimated as:

$$R_V = [(1-\rho_L/\rho_S)(R_{PS/T}^3 - R_{PS}^3)]^{1/3} \quad (1)$$

In the last step, the frozen sample is slowly warmed to allow the second solvent to evaporate in a vacuum or under ambient pressure. Once the temperature reaches the melting point of the second solvent, the polymer chains migrate toward the surface of each particle as driven by the flux of evaporating second solvent, increasing the void size from R$_V$ to R$_H$, which can be estimated from R$_{PS}$ and R$_{PS/T}$ as the following:

$$R_H = [(R_{PS/T}^3 - R_{PS}^3)]^{1/3} \quad (2)$$

In general, R$_H$ is 80% larger than that of R$_V$ when toluene is used as the swelling agent. As the solvent evaporates, a hole of R$_O$ in radius appears in the shell of each hollow particle due to the presence of an evaporation flux. It is worth noting that the entire evaporation process must be carried out below the freezing temperature of the first solvent in order to preserve the porous hollow structure. Otherwise, the hollow particles will be compressed into solid ones by the surrounding first solvent. A similar approach is applicable to other organic polymers as long as they can be prepared as colloidal particles that can be swollen with an appropriate solvent.

In another aspect, the present invention provides an emulsion method for making a hollow, polymer particle having a single, substantially circular opening, comprising: dissolving a polymer in a first solvent; adding the dissolved polymer solution to a second solvent solution containing a surfactant; agitating the mixture providing an emulsion of the polymer in the second solvent; cooling the second solvent emulsion below the freezing temperature of the second solvent to create a void within each particle, providing second solvent-containing particles with frozen second solvent; and warming the second solvent-containing particles having frozen solvent, wherein the second solvent escapes from the particle resulting in the formation of a single opening in the surface of the particle to provide a hollow, polymer particle having a single, substantially circular opening. This method is shown in FIG. 2 and EXAMPLE 2.

FIG. 2 depicts a schematic outline for the synthesis of hollow polymer particles from an emulsion. FIG. 2A and FIG. 2B depict polymer bowls without and with nanopores in the surface, respectively.

In the emulsion method, a polymer is dissolved in an organic first solvent and the polymer solution is added to an immiscible second solvent in which surfactants are dissolved. Representative polymers used in this emulsion method include PMMA, PCL (Aldrich, M$_n$=80,000), PLLA (Aldrich, M$_n$=75,000). Representative first solvents include toluene or a mixture of toluene and chloroform (1:1 v/v). A representative second solvent is water. A representative surfactant is styrenesulfonic acid sodium salt hydrate (Aldrich). The concentration of the polymer in the solvent will depend on the degree of nanopore formation desired on the surface of the final hollow particle. If nanopores are desired, a smaller concentration of polymer should be used. Nanopore-free particles will result from the use of about 10 wt % polymer in solution. 5 wt % polymer in solution will result in the formation of nanopores.

Agitation of the bilayer produces polymer/second solvent emulsions stabilized by the surfactants. A representative method of agitation is vortexing.

The remainder of the process is similar to that used for amorphous polymers, as described above. The solution is quenched by $LN_2$ and the solvent is allowed to slowly evaporate. This process can take a number of days. For fast evaporation, vacuum suction can be employed. The polymer emulsions produce hollow polymer particles each having a single large hole in the surface. The presence of nanopores in the polymer particles depends on the volume fraction of solvent in the polymer emulsions. Emulsions with high polymer concentration may not produce nanopores, but those with low polymer concentration will likely have nanopores in the surface of the resulting hollow polymer particles.

Figure 3A:
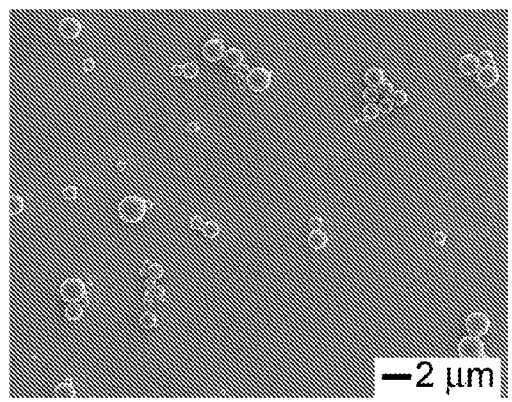
FIGS. 3A-3C show electron micrographs of polymethylmethacrylate (PMMA) particles made from an emulsion both before (FIG. 3A) and after (FIG. 3B and FIG. 3C) quenching with liquid nitrogen.
Figure 3B:
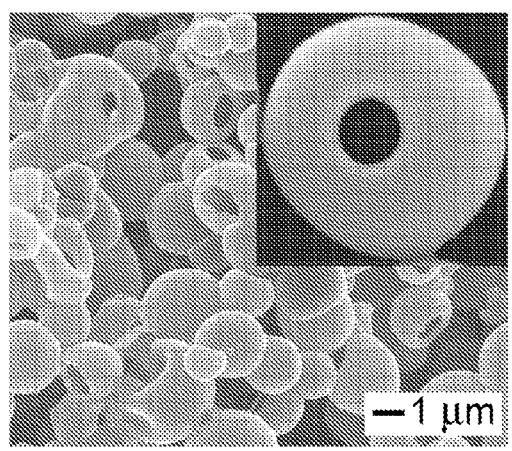
Figure 3C:
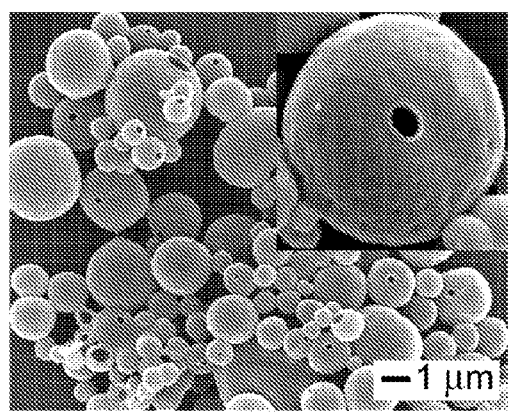

FIG. 3 shows SEM images obtained from emulsions of PMMA/toluene before (FIG. 3A) and after (FIG. 3B and FIG. 3C) quenching with $LN_2$ and following drying process. The polymer concentrations in toluene were 10 wt % and 5 wt % for FIG. 3B and FIG. 3C, respectively. The PMMA solutions (1 mL) were added to 10 mL of water in which styrenesulfonic acid sodium salt hydrate was dissolved. Strong vortexing was applied for 5 minutes and the emulsion solution was kept still for 30 minutes. The solution had two layers, an upper water layer containing small PMMA/toluene emulsions and a bottom concentrated polymer layer that was formed by agglomeration of polymer emulsions that were not stabilized by the surfactant. The upper layer was used to form the hollow polymer particles. FIG. 3A shows the PMMA colloids from 10 wt % PMMA emulsions after drying. The colloids were spherical. The emulsions from 5 wt % PMMA solutions showed no difference in the shape and size distribution. The hollow PMMA colloids shown in FIG. 3B were obtained from the 10 wt % polymer solution. The particles had one large hole in the very smooth surfaces and did not have any nanopores. In contrast, the colloids in FIG. 3C obtained from the 5 wt % polymer solution had one large hole and nanopores in the surfaces. The less swollen PMMA emulsions did not have nanopores, but the much swollen ones did, similar to the hollow polymer particles formed using amorphous particles.

Figure 4A:
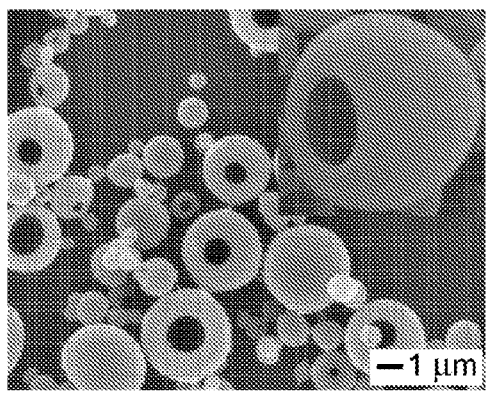
FIGS. 4A-4D show electron micrographs of hollow colloids made of polycaprolactone (PCL) (FIG. 4A and FIG. 4B) and poly(L-lactic acid) (PLLA) (FIG. 4C and FIG. 4D) according to the degree of swelling.
Figure 4B:
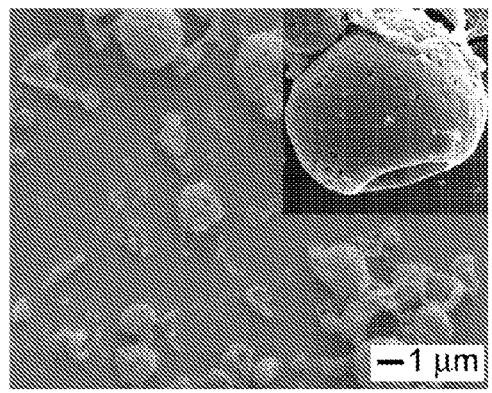
Figure 4C:
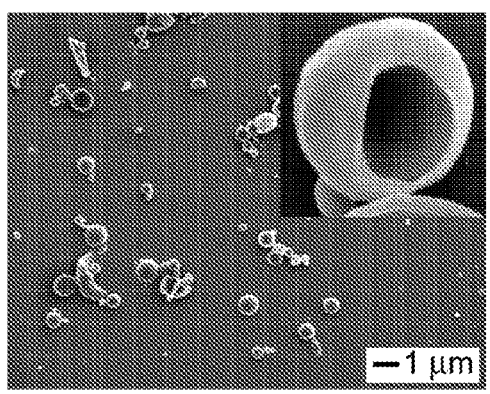
Figure 4D:
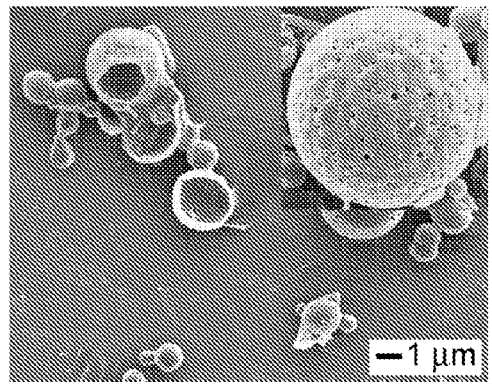

Similar procedures as used with PMMA emulsions were used with crystalline polymers. Polycaprolactone (PCL) and poly(L-lactic acid) (PLLA) were chosen as model polymers because they are commonly used in drug delivery systems due to their biodegradability and biocompatibility. PCL was dissolved in toluene and PLLA was dissolved in the co-solvent of toluene and chloroform (1:1, v/v). The concentrations of polymers were fixed at 10 wt % and 5 wt %. The polymer solutions (1 mL) were added to 10 mL of water containing styrenesulfonic acid sodium salt hydrate and strong vortexing was applied for 5 minutes. After 30 minutes of resting, the upper layer in the emulsion solution were moved to another bottle and used in the process of $LN_2$ quenching. FIGS. 4A and 4B are SEM results obtained from 10 wt % and 5 wt % PCL solutions, respectively after quenching and drying. While the result from the less swollen PCL (10 wt % PCL) showed smooth surfaces without nanopores, the much swollen PCL (5 wt % PCL) produced hollow colloids with a large hole and nanopores. In the PCL emulsions the final morphology was sensitive to the polymer concentration. For 10 wt % concentration the spherical shapes were maintained, but for 5 wt % concentration some of the PCL particles were broken into small pieces as shown in FIG. 4B. The same tendency was observed in PLLA emulsions. FIGS. 4C and 4D are results from 10 wt % and 5 wt % PLLA solutions, respectively. Smooth surfaces with no nanopores were observed in less swollen PLLA while the formation of nanopores were apparent in much swollen PLLA emulsions.

In another aspect, the present invention provides a method for encapsulating material within a polymer particle comprising contacting a plurality of hollow, polymer particles, each having a single, substantially circular opening, with a material such that at least some of the material is positioned within the hollow, polymeric particle, and then closing the opening to provide a polymer particle containing the material. This is described in EXAMPLE 2.

Figure 5A:
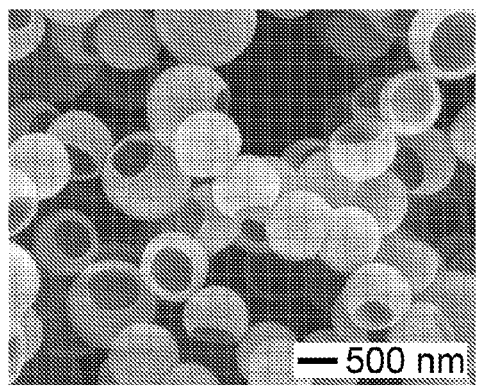
FIG. 5A-5D show electron micrographs of the closure of the holes in the surface (FIG. 5A) of the hollow polystyrene (PS) particles by thermal annealing (FIG. 5B) and solvent treatment (FIG. 5C and FIG. 5D)
Figure 5B:
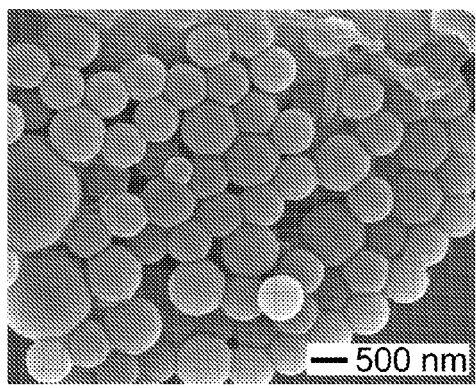

The hole in the polymer shell can be closed by causing the polymer chains within the shell to migrate without destroying the hollow structure. Thermal annealing at a temperature above the glass transition temperature ($T_g$) of amorphous polymer like PS and PMMA will close the hole, with the amount of time needed for the annealing being dependent on the size of the hole to be closed. The larger the hole, the longer this will take. This process will typically take less than 6 hours. FIG. 5A shows PS particles obtained from pre-made PS colloids 400 nm in diameter. The hollow structures with a hole in FIG. 5A were transformed into solid PS colloids, as shown in FIG. 5B, by thermal annealing at about 80° C. in water. Because the swelling, followed by solidification, makes more void volume between PS chains, the glass transition temperature decreased to about 80° C., which is about 20° C. lower than that of bulk PS (about 100° C.).

Figure 5C:
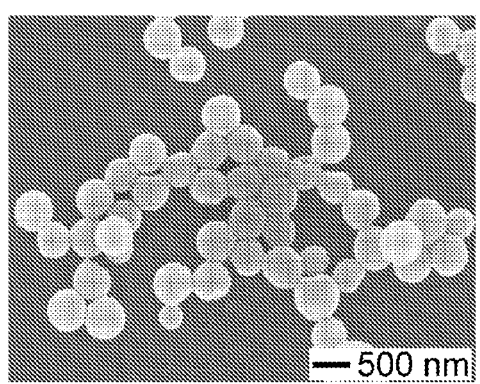
Figure 5D:
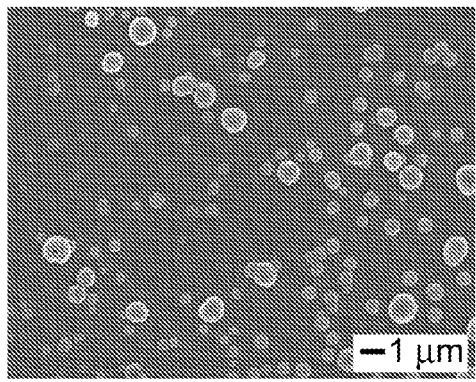

Besides thermal annealing, slight swelling of the PS hollow polymer particles with a solvent can also form sealed capsules at or below 40° C. For example, addition of a small amount of toluene (2%, v/v) to an aqueous suspension of the PS hollow polymer particles can induce the polymer chains to migrate and completely close the holes at room temperature within 1 hour. Like thermal annealing, the addition of toluene may also denature encapsulated proteins. This problem can be solved by switching to a non-denaturing solvent (e.g., 1,4-dioxane). It has been reported that aqueous dioxane (at or below 10% v/v) has no influence on the conformations of most proteins. FIG. 5C shows the solid PS colloids changed from the colloids in FIG. 5A after closing the holes in 10% aqueous dioxane at 40° C. for 6 hours. The same procedure was used to close the holes in crystalline hollow polymer particles. FIG. 5D was obtained from PLLA bowls after treatment in 10% aqueous dioxane. The holes were completely closed as shown in the figure. By screening through different combinations of solvent type, concentration, and temperature, it should be possible to find the optimal condition for any protein.

In one embodiment, the material enclosed is a small molecule, a macromolecule, a nanoparticle, or a colloidal particle, as described in EXAMPLE 2.

Representative small molecules include the fluorescent dye coumarin-6. Representative macromolecules include the fluorescent protein dinitrophenol-conjugated bovine serum albumin Representative nanoparticles include nanometer-scale superparamagnetic iron oxide particles. Representative colloidal particles for loading into the hollow particles include polystyrene particles of a diameter smaller than the size of the opening in the surface of the polymer particle of the present invention.

In a further embodiment, the small molecule, macromolecule, nanoparticle, or colloidal particle is substantially positioned inside the radius of the polymer particle. This includes materials that are physically within the void of the hollow particle and materials incorporated into the polymeric lattice of the polymer shell. An example of a material being incorporated in to the polymeric lattice of the polymer shell would be a small molecule that was dissolved in a solvent, also containing polymer particles, that allowed the small molecule to be absorbed or adsorbed by the polymer particles. When the polymer particle is removed from the small molecule containing solvent, the small molecules will remain on the surface of the polymer particle or within the polymeric lattice of the polymer particle.

After a material is loaded into a hollow polymer particle, there are many potential applications. If a biodegradable polymer is used to create the hollow polymer shell, then the material contained in the shell would be released if the polymer shell degrades in the body. An example of this application would be time-released drug delivery where the drug is loaded into the hollow polymer particle, the hole in the shell is closed, and the particle administered to a patient in need of the drug. As the polymer degrades in the body, the drug is slowly released, allowing for treatment over a long period of time based on the thickness and decomposition rate of the polymer shell material used. Given the use of functional groups on the surface of particular embodiments of the present invention, in addition to allowing for timed drug delivery, the presence of different surface treatments may allow for the targeting of the loaded polymer particles, by the body, to specific organs for more direct and effective delivery.

Further uses of the present invention include cosmetics, inks, pigments, environmental cleaning, and imaging.

The following examples are provided for the purpose of illustrating, not limiting, the invention.

EXAMPLES

Example 1

Synthesis of Polystyrene Solid Beads

In a typical synthesis, 350 g deionized water was placed in a flask and heated to 70° C. under magnetic stirring at 300 rpm. Sodium styrene sulfonate (0.04 g) and sodium hydrogen carbonate (0.25 g) were then added as the emulsifier and buffer, respectively. The reaction mixture was continuously stirred while 150 g of styrene (the monomer) and 0.25 g of potassium persulfate (the initiator) were added at t=10 min and 1 h, respectively. The polymerization was allowed to proceed under nitrogen protection for 18 h.

Example 2

Preparation of Representative Polystyrene Hollow Particles

In a typical procedure, 0.5 mL aqueous suspension of PS solid beads (5% by wt.) was added to a mixture of 4 mL deionized water (18 MΩ) and 0.2 mL toluene (or other swelling agents). The mixture was then magnetically stirred for 30 min, allowing all the toluene to enter the PS beads. The suspension was then added to liquid nitrogen dropwise to generate PS hollow particles. Finally, the frozen sample was slowly warmed up (at a rate of 30° C./h from −196 to 0° C.) to let the solvent slowly evaporate either in vacuum or under ambient pressure. The temperature was controlled below 0° C. by surrounding the sample with a cooling bath or keeping the sample in a freezer. The as-synthesized samples were characterized by both SEM and TEM.

FIG. 6 shows SEM images of several typical examples. The PS solid beads (FIG. 6A) were prepared with a uniform size using surfactant-free emulsion polymerization. The average radius and polydispersity (PD, or the relative standard deviation) were 200 nm and 0.8%, respectively. These monodisperse particles readily assembled into a hexagonal lattice when the aqueous suspension was placed on a silicon substrate and dried under ambient conditions. FIG. 6B shows an SEM image of resultant hollow particles when toluene was employed as the swelling agent. This image confirms that the solid beads were swollen by toluene because the average outer radius and PD were increased to 269 nm and 5.5%, respectively. The degradation in monodispersity was probably caused by the collision and thus exchange of materials between some swollen particles, as well as the heterogeneity commonly associated with a swelling process. The image also indicates that each hollow particle is in the shape of a bowl, with an opening of 224 nm in radius ($R_O$) on its surface. The TEM image depicted in the inset further confirms the bowl-shaped profile and gives a value of 210 nm for $R_O$. For this particular sample, the values of $R_V$ and $R_H$ were 122 nm and 222 nm, respectively, as estimated from equations°(1) and (2). Note that the values of $R_H$ estimated from equation (2) and measured by SEM or TEM agree reasonably well.

It was possible to control both $R_H$ and $R_O$ using a number of methods. The effects of solvents (toluene vs. styrene) with a similar solubility parameter for PS chains, but different melting points was examined. In general, the solubility parameter (δ) of a solvent can be written as:

$$\delta^2 = \delta_d^2 + \delta_p^2 + \delta_h^2 \quad (3)$$

where $\delta_d$, $\delta_p$, and $\delta_h$ represents the contribution from dispersion force, polar interactions, and hydrogen bonding, respectively. According to Van Krevelen, each of these components can be calculated from the constituent, structural units as the following:

$$\delta_d = \Sigma F_{di}/V, \; \delta_p = (\Sigma F_{pi}^2)^{0.5}/V, \; \delta_h = (\Sigma F_{hi}/V)^{0.5} \quad (4)$$

Figure 6A:
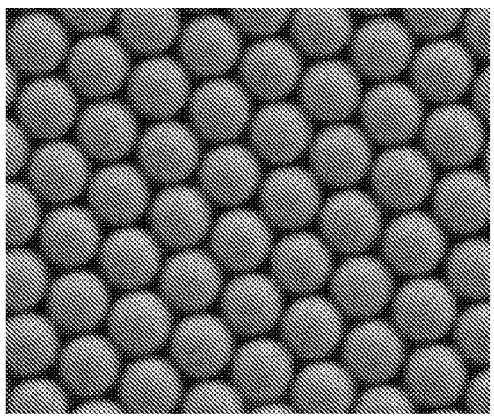
FIGS. 6A-6D show electron micrographs of PS particles (FIG. 6A) and hollow PS particles with holes in their surfaces (FIG. 6B, FIG. 6C, and FIG. 6D)
Figure 6B:
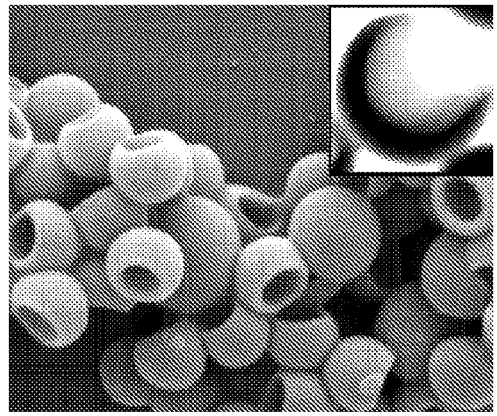
Figure 6C:
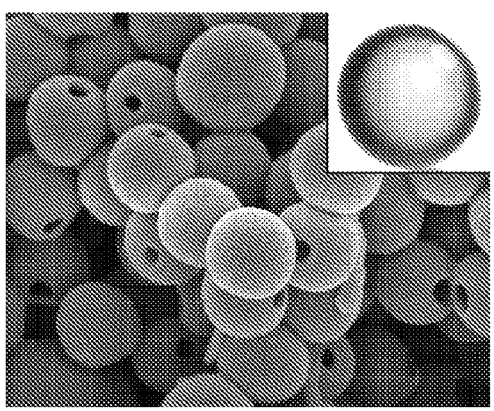

The solubility parameter calculated for toluene and styrene is 17.4 and 17.8, respectively. As the solubility parameter of PS is 20.1, the solubility of PS in both toluene and styrene should be roughly the same and the volumes of swollen PS beads are expected to be nearly identical. FIG. 6C shows an SEM image of PS hollow particles that were prepared under the same conditions as for FIG. 6B, except for the use of styrene as the swelling agent. Note that the outer radii of resultant hollow particles were very similar: 269 nm (PD=5.5%) and 290 nm (PD=3.5%) when toluene and styrene were employed as the swelling agent, respectively. However, the holes in their surfaces were substantially different in size: the holes resulting from the evaporation of styrene became 50 nm in radius, which was much smaller than those created via toluene evaporation (224 nm in radius as measured from SEM image). The inset of FIG. 6C shows TEM image of a hollow particle whose opening was measured 70 nm in radius. The opening size may have a correlation with the melting point of the solvent. For these two samples, the melting point of toluene and styrene is −93° C. and −31° C., respectively. In the solvent evaporation step, solid toluene changes into liquid and then vapor phase more quickly, as compared to solid styrene. As a result, a stronger flux of solvent evaporation is involved in the toluene case, leading to the formation of holes with larger openings.

Figure 6D:
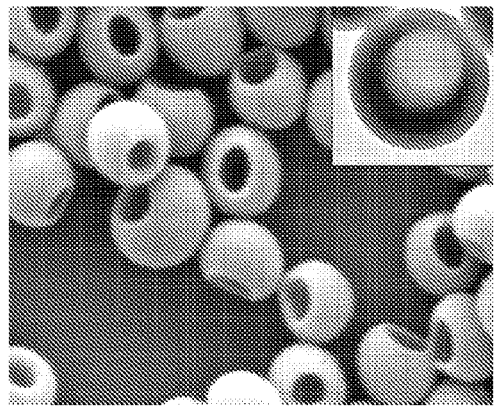

The exact condition under which the solvent evaporates also has profound influence on the hole size. The sample shown in FIG. 6C was prepared by letting the styrene evaporate below its melting point under vacuum FIG. 6D shows another sample that was prepared using a similar procedure except that the styrene evaporated under ambient pressure and at a temperature higher than the melting point of styrene. It is clear that the outer radii of the hollow particles in FIG. 6C and FIG. 6D are very close, implying that the volume expansion due to swelling was essentially the same and the particle size was maintained in the solvent evaporation process because the particles were surrounded by a rigid matrix of ice for both samples. However, the hollow particles shown in FIG. 6D have a larger opening for the hole in the surface (126 nm in radius) as compared with the sample shown in FIG. 6C (50 nm). The enlargement of opening is related to the magnitude of evaporation flux: as the temperature is increased, the flux of styrene evaporation becomes stronger leading to a larger opening at the surface. For each sample, the standard deviation of hole size was typically within 10% when measured from more than 100 particles by SEM or TEM imaging.

Figure 7A:
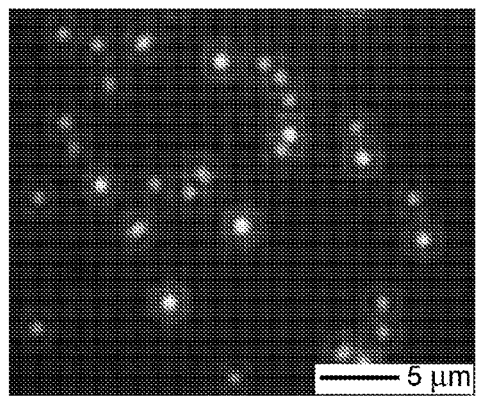
FIGS. 7A-7D show fluorescence (FIG. 7A and FIG. 7B) and electron (FIG. 7C and FIG. 7D) micrographs of hollow polymer beads loaded with various functional materials.

The existence of holes in the surfaces the PS hollow particles allows for direct loading of functional materials. After loading, the holes can be closed by annealing the system at a temperature slightly above the glass transition temperature ($T_g$) of PS. Because swelling and solidification increase the void spaces between PS chains, the $T_g$ dropped to about 80° C., which is about 20° C. lower than that of bulk PS. Microencapsulation was demonstrated using a number of functional species. Firstly, coumarin-6 was used as an example of small molecule. The final product was centrifuged and washed with deionized water several times to remove the excess fluorescent dyes. FIG. 7A shows a fluorescence micrograph, clearly showing that the dyes were encapsulated in the PS particles.

Figure 7B:
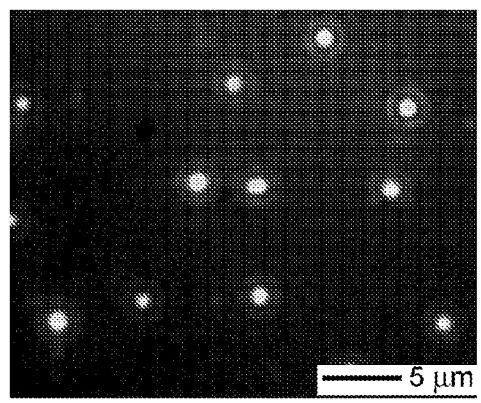

Secondly, the encapsulation of macromolecules was demonstrated: dinitrophenol-conjugated bovine serum albumin (DNP-BSA), a fluorescent protein. FIG. 7B shows fluorescence image of the final product. Again, it was apparent that all PS particles were loaded with the protein. When PS solid beads without holes were used, no fluorescence was observed after washing with water.

Figure 7C:
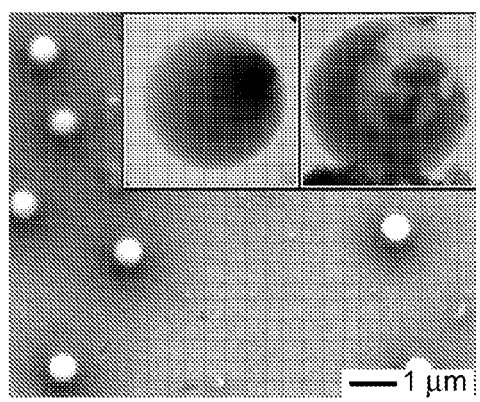

Thirdly, superparamagnetic iron oxide nanoparticles were encapsulated by co-dispersing the PS hollow particles with a nonaqueous ferrofluid, followed by brief sonication and thermal annealing FIG. 7C shows SEM and TEM (the left inset) images of the final product where the excess iron oxide nanoparticles (outside the PS beads) had been selectively dissolved with aqueous HCl. Both images suggest that the PS hollow particles had been transformed into solid particles during the thermal annealing process. Due to the loading of iron oxide nanoparticles, the diameter of the PS particles increased from 400 nm (for the original PS solid beads) to 500 nm The right inset shows a TEM image of the bowl-shaped PS particle before thermal treatment. It is clear that some iron oxide nanoparticles had been inserted into the PS particle through the hole and there were also aggregates of iron oxide nanoparticles around the hollow particle.

Figure 7D:
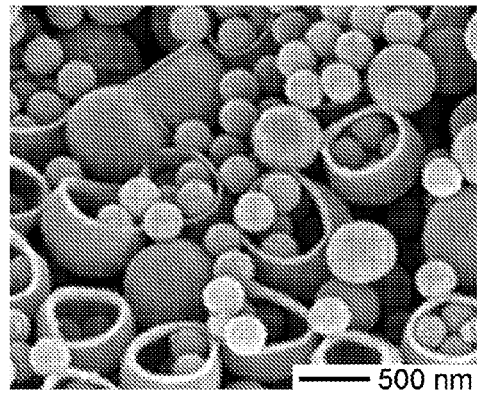

Although it has been demonstrated that quantum dots can be incorporated into crosslinked PS beads by swelling with the appropriate solvent, it is a slow process to directly insert nanoparticles into polymer shells through diffusion. Bowl-shaped PS particles were used as containers to hold and confine the self-assembly of spherical colloids. FIG. 7D shows a typical example where the bowl-shaped PS particles were co-dispersed in water with 260 nm PS solid beads and briefly sonicated. As driven by the hydrophobic interactions, most of the bowls were loaded with PS solid beads.

Preparation of Hollow Polymer Particles from an Emulsion

FIG. 3 shows SEM images obtained from emulsions of PMMA/toluene before (FIG. 3A) and after (FIG. 3B and FIG. 3C) quenching with $LN_2$ and following drying process. The polymer concentrations in toluene were 10 wt % and 5 wt % for FIG. 3B and FIG. 3C, respectively. The PMMA solutions (1 mL) were added to 10 mL of water in which styrenesulfonic acid sodium salt hydrate is dissolved as a surfactant. Strong vortex (Scientific Industry, Vortex Genie 2) was applied for 5 min and the emulsion solution was kept still for 30 min The solution had two layers, an upper water layer containing small PMMA/toluene emulsions and a bottom concentrated polymer layer that was formed by agglomeration of polymer emulsions that were not stabilized by the surfactant. The upper layer was used for the following experiment. FIG. 3A shows the PMMA colloids from 10 wt % PMMA emulsions after dried on a Si wafer. The emulsions from 5 wt % PMMA solutions showed no difference in the shape and size distribution. The hollow PMMA colloids shown in FIG. 3B were obtained from the 10 wt % polymer solution. The particles had one large hole in the very smooth surfaces and did not have any nanopores. In contrast, the colloids in FIG. 3C obtained from the 5 wt % polymer solution had one large hole and small nanopores in the surfaces. The less swollen PMMA emulsions did not have nanopores, but the much swollen ones did, which is consistent with the results from the pre-made PS colloids.

Similar procedures as used with PMMA emulsions were employed to crystalline polymers. Polycaprolactone (PCL) and poly(L-lactic acid) (PLLA) were chosen as model polymers because they are commonly used in drug delivery systems due to their biodegradability and biocompatibility. PCL was dissolved in toluene and PLLA was dissolved in the co-solvent of toluene and chloroform (1:1, v/v). The concentrations of polymers were fixed at 10 wt % and 5 wt %. The polymer solutions (1 mL) were added to 10 mL of water containing styrenesulfonic acid sodium salt hydrate and strong vortex was applied for 5 min. After 30 min of incubation, the upper layer in the emulsion solution were moved to another bottle and used in the process of $LN_2$ quenching. FIGS. 4A and 4B are SEM results obtained from 10 wt % and 5 wt % PCL solutions, respectively after quenching and drying. While the result from the less swollen PCL (10 wt % PCL) showed smooth surfaces without nanopores, the much swollen PCL (5 wt % PCL) produced hollow colloids with a large hole and nanopores. It was found that in the PCL emulsions the final morphology were sensitive to the polymer concentration. For 10 wt % concentration the spherical shape were maintained, but for 5 wt % concentration some of the PCL particles were broken into small pieces as shown in FIG. 4B. The same tendency was observed in PLLA emulsions. FIGS. 4C and 4D are results from 10 wt % and 5 wt % PLLA solutions, respectively. Smooth surfaces with no nanopores were observed in less swollen PLLA while the formation of nanopores were apparent in much swollen PLLA emulsions.

While illustrative embodiments have been illustrated and described, it will be appreciated that various changes can be made therein without departing from the spirit and scope of the invention.

The invention claimed is:

1. A method for making a hollow polymer particle having a single, substantially circular opening in its surface, comprising:
   (a) suspending solid polymer particles in a first solvent to provide first-solvent-suspended particles;
   (b) swelling the first-solvent-suspended particles with a second solvent to provide second-solvent-swollen particles;
   (c) cooling the second-solvent-swollen particles below the freezing temperature of the second solvent, creating a void within each particle to provide second-solvent-containing particles having frozen second solvent; and
   (d) warming the second-solvent-containing particles having frozen solvent, such that the second solvent escapes from the particles resulting in the formation of a single opening in the surface of each particle to provide a hollow polymer particle having a single, substantially circular opening in its surface.

2. The method of claim 1, wherein the first solvent comprises water.

3. The method of claim 1, wherein the second solvent comprises an organic solvent.

4. The method of claim 1, wherein the second solvent is selected from the group consisting of toluene and styrene.

5. The method of claim 1, wherein the polymer particles are selected from the group consisting of polystyrene, polymethylmethacrylate, polycaprolactone, and poly(L-lactic acid) particles.

6. The method of claim 1, wherein cooling the second-solvent-swollen particles comprises cooling with liquid nitrogen.

7. The method of claim 1, wherein the second solvent is allowed to escape by evaporation.

8. The method of claim 7, wherein the evaporation occurs below the ambient-pressure melting point of the second solvent and under vacuum.

9. The method of claim 7, wherein the evaporation occurs above the melting point of the second solvent and under ambient pressure.

10. A method for making a hollow polymer particle having a single, substantially circular opening in its surface, comprising:
    (a) dissolving a polymer in a first solvent to provide a dissolved-polymer solution;
    (b) adding the dissolved-polymer solution to a second-solvent solution containing a surfactant to provide a mixture;
    (c) agitating the mixture to provide an emulsion of the polymer in the second solvent, wherein the emulsion comprises a plurality of particles of the polymer;
    (d) cooling the second-solvent emulsion below the freezing temperature of the second solvent to create a void within each particle to provide second-solvent-containing particles having frozen second solvent; and
    (e) warming the second-solvent-containing particles having frozen solvent, such that the second solvent escapes from the particle, resulting in the formation of a single opening in the surface of each particle to provide a hollow polymer particle having a single, substantially circular opening in its surface.

11. The method of claim 10, wherein the first solvent comprises water.

12. The method of claim 10, wherein the second solvent comprises an organic solvent.

13. The method of claim 10, wherein the second solvent is selected from the group consisting of toluene and styrene.

14. The method of claim 10, wherein the polymer is selected from the group consisting of polystyrene, polymethylmethacrylate, polycaprolactone, and poly(L-lactic acid).

15. The method of claim 10, wherein cooling of the second-solvent-swollen particles comprises cooling with liquid nitrogen.

16. The method of claim 10, wherein the second solvent is allowed to escape by evaporation.

17. The method of claim 16, wherein the evaporation occurs below the ambient-pressure melting point of the second solvent and under vacuum.

18. The method of claim 16, wherein the evaporation occurs above the melting point of the second solvent and under ambient pressure.

* * * * *